No. 745,006. PATENTED NOV. 24, 1903.
H. L. FULENWIDER & A. C. WOOD.
CONSUMPTION OR PREVENTION OF SMOKE.
APPLICATION FILED JUNE 30, 1903.
NO MODEL. 5 SHEETS—SHEET 1.
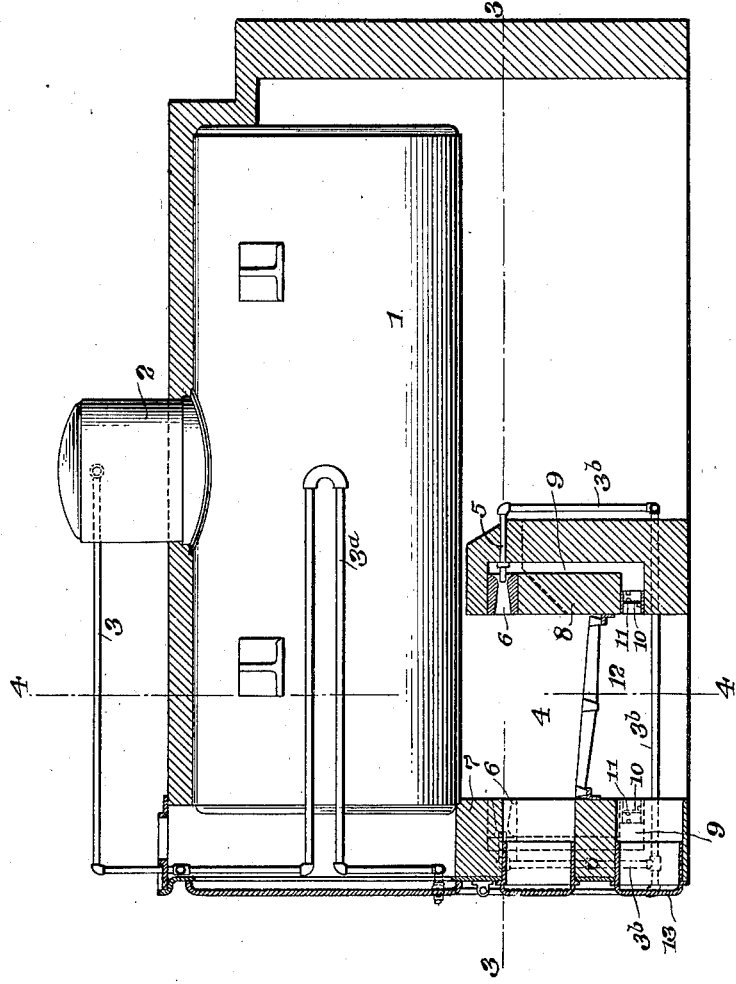
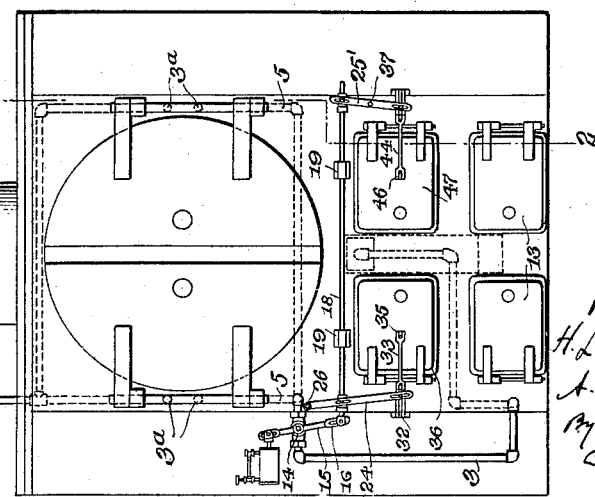

No. 745,006. PATENTED NOV. 24, 1903.
H. L. FULENWIDER & A. C. WOOD.
CONSUMPTION OR PREVENTION OF SMOKE.
APPLICATION FILED JUNE 30, 1903.
NO MODEL. 5 SHEETS—SHEET 2.
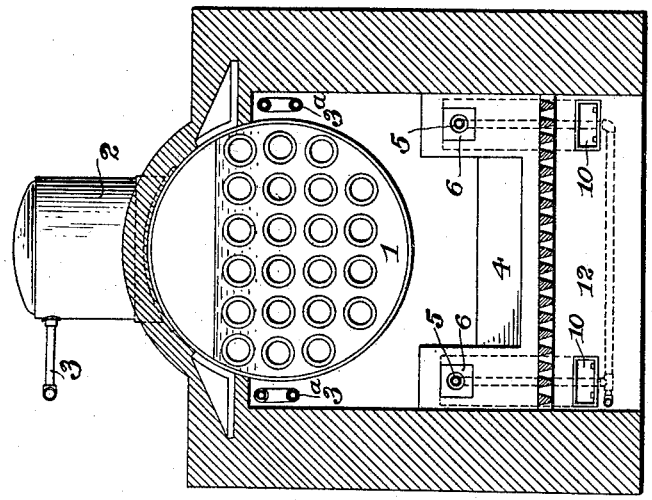
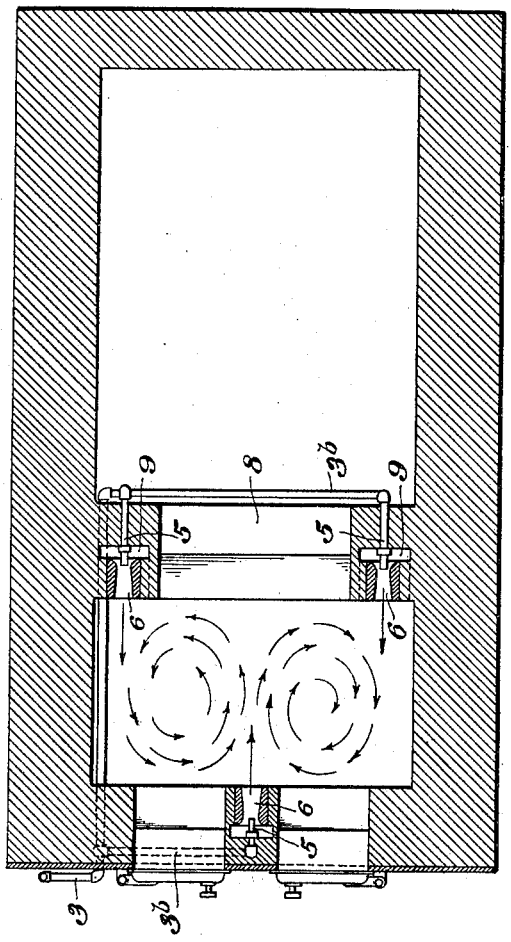

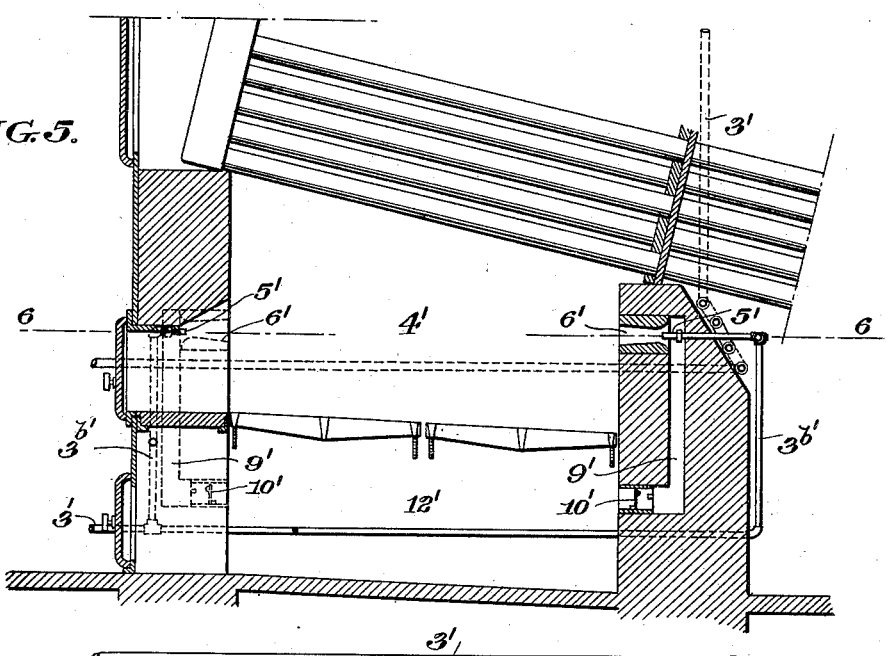
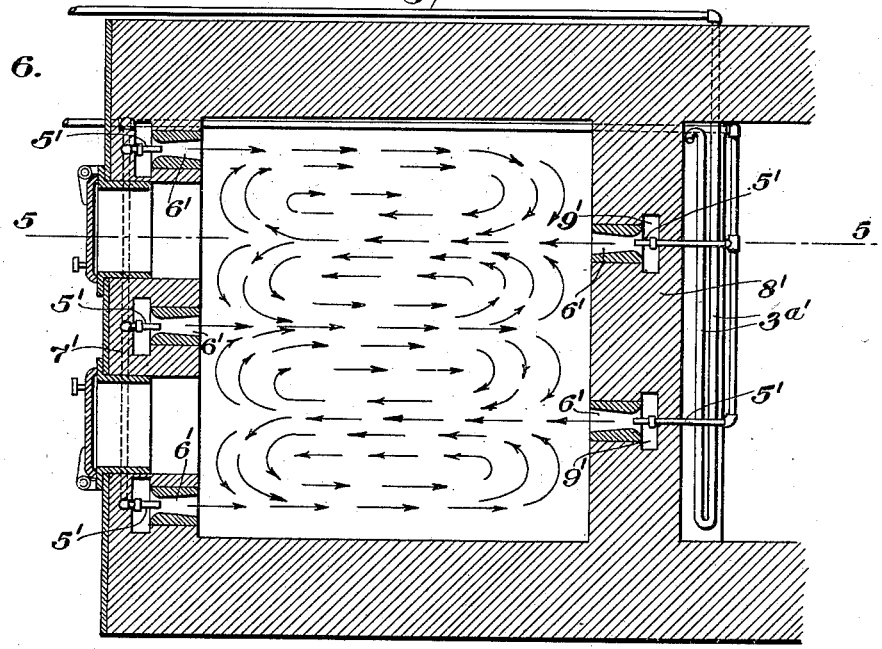

No. 745,006. PATENTED NOV. 24, 1903.
H. L. FULENWIDER & A. C. WOOD.
CONSUMPTION OR PREVENTION OF SMOKE.
APPLICATION FILED JUNE 30, 1903.
NO MODEL. 5 SHEETS—SHEET 4.
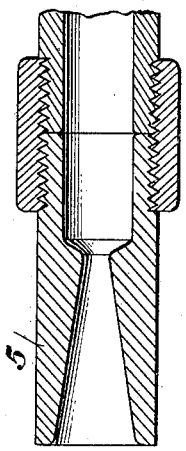
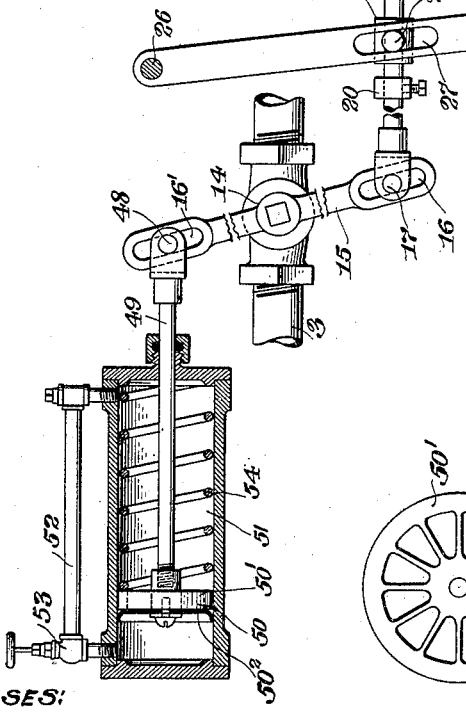
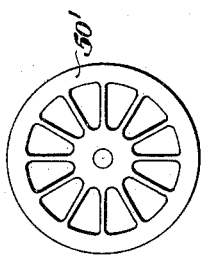
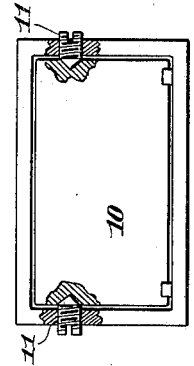
WITNESSES:
INVENTORS:
H. L. Fulenwider and
A. C. Wood
By C. N. Butler
Attorney No. 745,006. PATENTED NOV. 24, 1903.
H. L. FULENWIDER & A. C. WOOD.
CONSUMPTION OR PREVENTION OF SMOKE.
APPLICATION FILED JUNE 30, 1903.
NO MODEL. 5 SHEETS—SHEET 5.

No. 745,006. Patented November 24, 1903.

UNITED STATES PATENT OFFICE.

HENRY L. FULENWIDER, OF WILMINGTON, DELAWARE, AND ALBERT C. WOOD, OF PHILADELPHIA, PENNSYLVANIA.

CONSUMPTION OR PREVENTION OF SMOKE.

SPECIFICATION forming part of Letters Patent No. 745,006, dated November 24, 1903.

Application filed June 30, 1903. Serial No. 163,687. (No model.)

*To all whom it may concern:*

Be it known that we, HENRY L. FULENWIDER, of the city of Wilmington, State of Delaware, and ALBERT C. WOOD, of the city of Philadelphia, State of Pennsylvania, have jointly invented certain new and useful Improvements for the Consumption or Prevention of Smoke, of which the following is a specification.

These improvements have as their leading object the prevention or consumption of the smoke produced by a boiler-furnace, due to escaping volatile hydrocarbons distilled from coal immediately after stoking, owing to inadequate means for the proper introduction of oxygen to and combustion of such gases.

By the present invention when a furnace-door is opened to stoke the fire superheated steam and air are automatically injected into the fuel-chamber and caused to swirl over the fuel-bed for such interval of time as may be required for introducing and combining the oxygen required for effecting the combustion of the unconsumed gases and the prevention of smoke, the steam and air so introduced being gradually cut off automatically as the hydrocarbons are consumed, thus preventing the loss of efficiency which would result from the introduction of more oxygen than required for effecting complete combustion. This mode of operation not only effects the desired consumption of smoke without checking the furnace action, but also affords distinct improvements in fuel economy and efficiency.

Figure 11:
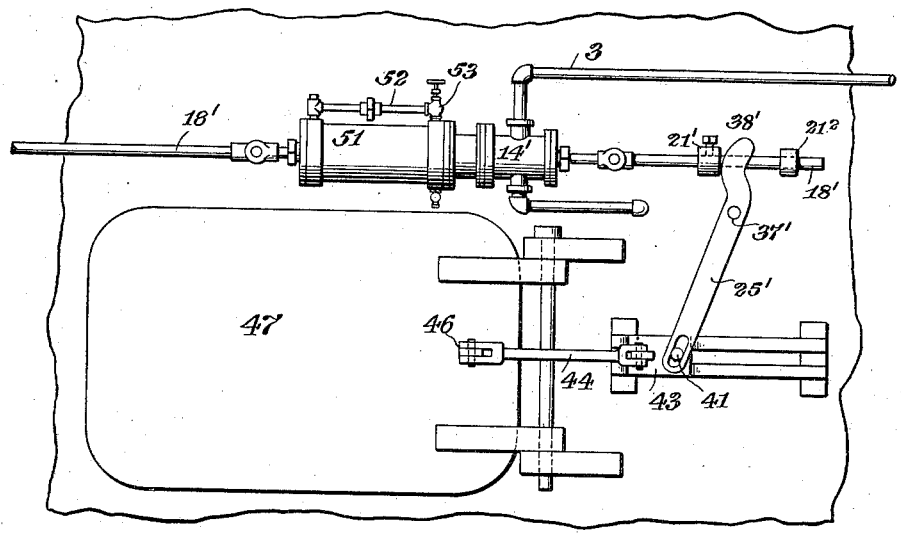
Figure 12:
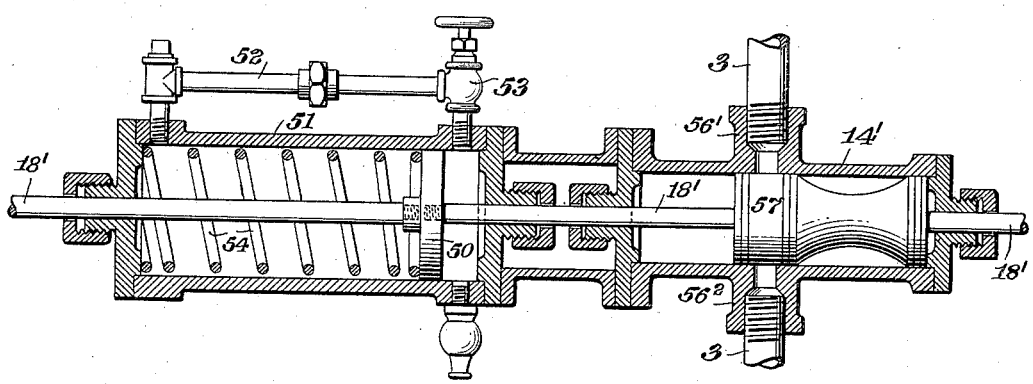

In the accompanying drawings, Figure 1 represents a front elevation of a boiler-furnace of the horizontal return tubular type having the invention applied thereto. Fig. 2 represents a vertical sectional view taken on the line 2 2 of Fig. 1. Fig. 3 represents a horizontal sectional view taken on the line 3 3 of Fig. 2. Fig. 4 represents a vertical sectional view taken on the line 4 4 of Fig. 2. Fig. 5 represents a vertical sectional view taken on the line 5 5 of Fig. 6, showing the improvements applied to a water-tube boiler-furnace. Fig. 6 represents a horizontal sectional view taken on the line 6 6 of Fig. 5. Fig. 7 represents a partial sectional elevation of the valve mechanism for controlling the flow of steam. Fig. 8 represents a plan view of the valve-piston. Fig. 9 represents a sectional elevation of the steam-nozzle. Fig. 10 represents an elevation of the air-valve and flue. Fig. 11 represents an elevation of a preferred form of valve mechanism, and Fig. 12 represents a sectional view taken through the valve shown in Fig. 11.

Referring to Figs. 1 to 4, inclusive, of the drawings, the boiler 1 has its steam-dome 2 connected with the steam-pipe 3, having the coiled branches $3^a$ extending into the path of the products of combustion escaping from the fuel-chamber 4 and the branches $3^b$ connected with the expansion-nozzles 5, Fig. 9, which eject steam through the expansion-ports 6, located in the front wall 7 and the bridge-wall 8 of the furnace. The ports 6 have free communication with the corresponding conduits 9, located, respectively, in the front wall and bridge-wall, each conduit being controlled by a valve 10, having the pivotal bearings 11, Fig. 10, and communicating with the ash-chamber 12, to which air is admitted by the doors 13.

As shown in Figs. 5 and 6 of the drawings, the steam-pipe 3' leads to the coils $3^{a\prime}$, located in the rear of the bridge-wall 8' and has the branches $3^{b\prime}$ leading to the nozzles 5', which discharge steam through the respective ports 6', located in the bridge-wall 8' and front wall 7', the flues 9', controlled by the valves 10', supplying air to the fuel-chamber 4' from the chamber 12'.

As shown in detail in Figs. 7 and 8, the flow of steam is controlled by a valve 14, operated by a lever 15, having therein a slot 16, which engages a pin 17 on the rod 18, which reciprocates in the fixed bearings 19. The rod 18 has thereon the collars 20 and 21, adapted to be moved and set at the desired points on the rod, which is actuated by the impact against the respective collars of the blocks 22 and 23, which slide upon the rod and are operated by the corresponding levers 24 and 25.

The lever 24 is fulcrumed upon the fixed bearing 26, is slotted at the point 27 to effect a movable engagement with the stud 28 of the block 22, and is slotted at the point 29 to provide a movable engagement with a stud 30 on a block 31, which is adapted to move in the fixed guide 32. A link 33, having the pivotal engagement 34 with the block 31 and the pivotal engagement 35 with the door 36, effects the movement of the block and lever operated thereby with the door.

The lever 25 is fulcrumed on the fixed bearing 37, has the slotted engagement 38 with the stud 39 of the block 23, and the slotted engagement 40 with the stud 41 on the block 42, which is adapted to move in the fixed guide 43. A link 44, having the pivotal connection 45 with the block 42 and the pivotal connection 46 with the the door 47, effects the movement of the block and lever with the door.

The lever 15 has the slot 16', which engages a stud 48 on the piston-rod 49, which operates the valve-piston 50 in the cylinder 51. The opposite ends of this cylinder are connected by the by-pass 52, controlled by a valve 53, and the cylinder contains the coiled spring 54, which acts against the valve-piston 50 to rock the lever 15 and close the valve 14. The valve-piston 50 comprises the open disk or spider 50' and the leather 50'', secured thereto, so that when the piston is drawn back against the action of the coiled spring 54 a fluid contained in the rear end flows through the piston into the forward end of the cylinder, and when the piston is released the compressed spring gradually moves it forward and closes the valve 14 in the time required for passing the fluid through the by-pass 52, the time being determined by the setting of the valve 53.

As shown in Figs. 11 and 12, the flow of steam is controlled by a valve comprising a cylinder 14', having the port connections 56' and 56'' with the pipe 3 and containing the piston 57 for controlling these ports. The piston is operated by a reciprocating rod 18', which carries a piston 50, adapted to reciprocate in the cylinder 51, the cylinder having its ends connected by the by-pass 52, controlled by the valve 53 and containing the spring 54. The rod 18' has fixed thereon the adjustable collar 21' and reciprocates in bearings, as $21^2$, being operated by a lever 25', fulcrumed at 37' and having a cam-like arm 38', adapted to engage the collar 21' to open the valve 57, which is gradually closed by the spring 54. The lever 25' has a pivotal connection 41 with a reciprocating block 43, connected by a link 44 with the door 47, as previously described.

It will now be understood that when a fuel-door is opened it effects the opening of the steam-valve and steam is injected by the nozzles through the ports in which they are situated, exhausting the air-conduits leading from the ash-chamber to the ports and causing the air-valves to be opened in proportion to the exhaust, whereby the requisite amount of heated air and steam are combined and circulated over the fuel-bed. As the steam-valve is gradually closed under the influence of its spring and the steam injected through the nozzle is gradually reduced the exhaust in the air-conduits is gradually reduced, and the air-valves are closed in proportion thereto, being wholly closed when the pressure on either side thereof becomes substantially equalized by completely cutting off the steam.

Having described our invention, we claim—

1. In a furnace, a fuel-chamber, an ash-chamber, an air-passage connecting said chambers, a gravity-closed valve for controlling the inlet to said passage, a nozzle for ejecting steam through the outlet from said passage, said valve and passage being opened by and in proportion to the flow of steam from said nozzle, a conduit leading to said nozzle, a valve for controlling said conduit, a door for said fuel-chamber, mechanism connecting said door and conduit-valve, and mechanism for automatically closing said conduit-valve, substantially as specified.

2. In a furnace, a fuel-chamber, air-ports leading to said chamber, steam-nozzles located in said air-ports, said ports and nozzles being located to act oppositely in couples causing swirling currents of combined air and steam, gravity-closed valves for controlling the flow of air through said ports, said valves being opened by the air-exhaust through said ports, a conduit connected with said nozzles, a valve for controlling said conduit, a door for said fuel-chamber, mechanism connecting said door and conduit-valve, and mechanism for gradually closing said conduit-valve and effecting the gradual closure of said first-named valves, substantially as specified.

3. In a furnace, a fuel-chamber, an air-port leading to said chamber, a steam-nozzle ejecting through said port, a conduit leading to said nozzle, a valve for controlling said conduit, a fuel-door for said chamber, mechanism connecting said door and valve whereby the opening of said door opens said valve, a piston connected with said valve to close the same, said piston having a port controlled by a valve, a cylinder within which said piston reciprocates, a by-pass connecting the ends of said cylinder, and a spring for actuating said piston and effecting the closure of said valves, substantially as specified.

4. In a furnace, a fuel-chamber, an ash-chamber, an expansion-port leading to said fuel-chamber, an air-passage leading from said ash-chamber to said port, an expansion-nozzle for ejecting steam through said port, a gravity-closed valve for controlling the inlet to said passage, a conduit connected with said nozzle, a valve for controlling said conduit, and mechanism for opening said conduit-valve and effecting the opening of said first-named valve in proportion thereto, substantially as specified.

5. In a furnace, in combination with a fuel-chamber, a steam-nozzle, a conduit leading to said nozzle, a cylinder in said conduit, a piston-valve in said cylinder, a second cylinder having its ends connected by a by-pass, a piston in said second cylinder, a rod connecting said pistons, a valve in said second piston, and a spring for effecting the closure of said valves, substantially as specified.

6. In a furnace, in combination with a door, a slide connected with said door, a lever connected with said slide, a rod connected with said lever, a conduit, a cylinder in said conduit, a piston in said cylinder and connected with said rod, a second cylinder, and a piston in said second cylinder connected with said first piston, substantially as specified.

7. In a furnace, a conduit, a cylinder in said conduit, a piston-valve in said cylinder, a second cylinder, a valved piston in said second cylinder connected with said piston-valve, a by-pass connecting the ends of said second cylinder, and a spring for actuating said valved piston and piston-valve, substantially as specified.

In testimony whereof we have hereunto set our hands, this 18th day of June, A. D. 1903, in the presence of the subscribing witnesses.

HENRY L. FULENWIDER.
ALBERT C. WOOD.

Witnesses:
LIDA C. GRANT,
UTLEY E. CRANE, Jr.